United States Patent
Swamy et al.

(10) Patent No.: US 9,025,748 B2
(45) Date of Patent: May 5, 2015

(54) DELIVERING SPECIALIZED SERVICES TO USERS OF PHONES

(75) Inventors: Sanjay Swamy, Bangalore (IN); Valerie Rozycki Wagoner, Dr. Modesto, CA (US); Amiya Pathak, Bangalore (IN)

(73) Assignee: Zipdial Mobile Solutions Pvt. Ltd, Bangalore (IN)

( * ) Notice: Subject to any disclaimer, the term of this patent is extended or adjusted under 35 U.S.C. 154(b) by 171 days.

(21) Appl. No.: 13/615,695

(22) Filed: Sep. 14, 2012

(65) Prior Publication Data

US 2013/0003955 A1    Jan. 3, 2013

Related U.S. Application Data

(63) Continuation of application No. PCT/IN2011/000177, filed on Mar. 17, 2011.

(51) Int. Cl.
H04M 3/42    (2006.01)

(52) U.S. Cl.
CPC ........... *H04M 3/42* (2013.01); *H04M 3/42059* (2013.01); *H04M 2203/1008* (2013.01); *H04M 2242/22* (2013.01)

(58) Field of Classification Search
USPC ............. 379/201.01, 142.01, 142.03, 142.09, 379/142.1, 142.14, 142.16–142.18
See application file for complete search history.

(56) References Cited

U.S. PATENT DOCUMENTS

| | | | | |
|---|---|---|---|---|
| 4,682,354 A | * | 7/1987 | Vanacore | 379/214.01 |
| 5,652,783 A | * | 7/1997 | Keba et al. | 370/313 |
| 5,724,404 A | * | 3/1998 | Garcia et al. | 379/32.02 |
| 5,852,807 A | * | 12/1998 | Skarbo et al. | 709/205 |
| 6,018,574 A | * | 1/2000 | Malik | 379/219 |
| 6,335,927 B1 | * | 1/2002 | Elliott et al. | 370/352 |
| 6,347,085 B2 | * | 2/2002 | Kelly | 370/352 |
| 6,442,263 B1 | * | 8/2002 | Beaton et al. | 379/142.04 |
| 6,882,828 B1 | | 4/2005 | Kregel | |
| 7,415,105 B2 | * | 8/2008 | Stein et al. | 379/211.02 |
| 7,668,539 B2 | | 2/2010 | Mathewson, II et al. | |
| 7,753,260 B2 | * | 7/2010 | Kanatani et al. | 235/380 |
| 7,885,995 B2 | * | 2/2011 | Barrett et al. | 709/202 |
| 7,921,167 B2 | * | 4/2011 | Shroff et al. | 709/206 |
| 7,974,877 B2 | * | 7/2011 | Ramanathan et al. | 705/14.55 |
| 8,005,904 B2 | * | 8/2011 | Yokoyama et al. | 709/206 |
| 8,130,928 B2 | * | 3/2012 | Bookstaff | 379/201.01 |
| 8,140,389 B2 | * | 3/2012 | Altberg et al. | 705/14.41 |

(Continued)

OTHER PUBLICATIONS

Amdocs Missed Call Notification, http://www.amdocs.com/Whitepapers/Network-Business-Unit/Datasheet%20-%20Amdocs%20Missed%20Call%20Notification.pdf, Downloaded circa Aug. 13, 2013, pp. 1-2.

(Continued)

*Primary Examiner* — William Deane, Jr.
(74) *Attorney, Agent, or Firm* — Narendra Reddy Thappeta (57) ABSTRACT

An aspect of the present invention enables users to avail specialized services using missed calls. In one embodiment, a missed call server on receiving an indication that a missed call has been placed by a user to a phone number, determines the specialized service corresponding to the phone number, and then sends a data to the service provider offering the determined service. The service provider then delivers the specialized service (sought to be availed) to the user. One of the specialized services is the delivery of content to the user. Thus, a user is enabled to access different contents by placing missed calls to the appropriate phone numbers.

14 Claims, 7 Drawing Sheets

(56) References Cited

U.S. PATENT DOCUMENTS

| | | | |
|---|---|---|---|
| 8,156,330 B2* | 4/2012 | Yu et al. | 713/168 |
| 8,442,562 B2* | 5/2013 | Konicek et al. | 455/466 |
| 8,488,768 B2* | 7/2013 | Finlayson et al. | 379/221.02 |
| 8,654,946 B1* | 2/2014 | Patro et al. | 379/201.01 |
| 2002/0151326 A1* | 10/2002 | Awada et al. | 455/556 |
| 2003/0043974 A1* | 3/2003 | Emerson, III | 379/88.13 |
| 2003/0088767 A1* | 5/2003 | Emerson, III | 713/153 |
| 2004/0017908 A1 | 1/2004 | Pelletier et al. | |
| 2004/0024856 A1* | 2/2004 | Gere | 709/223 |
| 2005/0096032 A1* | 5/2005 | Benco et al. | 455/422.1 |
| 2006/0050859 A1* | 3/2006 | Ootsuka | 379/142.01 |
| 2006/0294387 A1* | 12/2006 | McCracken et al. | 713/182 |
| 2007/0254636 A1 | 11/2007 | Jiang | |
| 2007/0281669 A1 | 12/2007 | Jiang | |
| 2007/0281687 A1 | 12/2007 | Jiang | |
| 2007/0293216 A1 | 12/2007 | Jiang | |
| 2008/0102864 A1 | 5/2008 | Donoghue | |
| 2008/0132255 A1 | 6/2008 | Benco et al. | |
| 2008/0134086 A1 | 6/2008 | Liao et al. | |
| 2008/0153503 A1 | 6/2008 | Birla et al. | |
| 2008/0263458 A1* | 10/2008 | Altberg et al. | 715/757 |
| 2009/0037173 A1* | 2/2009 | Hansen | 704/246 |
| 2010/0158227 A1* | 6/2010 | Grandhi et al. | 379/142.17 |
| 2011/0015987 A1* | 1/2011 | Chakraborty et al. | 705/14.39 |
| 2012/0278174 A1* | 11/2012 | Seo | 705/14.59 |
| 2012/0328090 A1* | 12/2012 | Macwan et al. | 379/114.03 |
| 2013/0132854 A1* | 5/2013 | Raleigh et al. | 715/738 |

OTHER PUBLICATIONS

Open code mobile network systems, http://www.opencode.com/solutions-1-9_Missed_Call_Alert_System.php, Downloaded circa Aug. 13, 2013, pp. 1-1.

The Rules of Beeping: Exchanging Messages Via Intentional "Missed Calls" on Mobile Phones, http://onlinelibrary.wiley.com/doi/10.1111/j.1083-6101.2007.00383.x/pdf, Journal of Computer-Mediated Communication vol. 13, Issue 1, date Oct. 2007m pp. 1-22.

* cited by examiner

DELIVERING SPECIALIZED SERVICES TO USERS OF PHONES

PRIORITY CLAIM AND CONTINUITY INFORMATION

The instant patent application is a continuation under 35 USC §365(c) of international application number PCT/IN2011/000177, entitled, "DELIVERING SPECIALIZED SERVICES TO USERS OF PHONES", International Filing Date of: 2011 Mar. 17, naming as inventors: Sanjay Swamy et al., which in turn claims priority from co-pending India Patent Application number 712/CHE/2010, filed on 2010 Mar. 17, and having the same Title as noted herein.

BACKGROUND OF THE INVENTION

1. Technical Field

The present disclosure relates to communication technologies, and more specifically to a system for delivering specialized services to users of phones.

2. Related Art

Phones are commonly used by users to communicate with other users over a network. Generally, a telecommunication company provides such a network and also various communication services that users can avail over the network. The communication services may include "core" services such as audio/video calling, facsimile (FAX), etc. and/or value added services (VAS) such as short message service (SMS), multi-media message service (MMS), emails, etc. as is well known in the arts.

Specialized services refer to a broad range of services that are provided either as part of or in addition to the VAS noted above. In general, such specialized services are provided/delivered by third-party service providers (using the infra-structure of the telecommunication company) in contrast to VAS which is generally provided/delivered by the telecommunication company itself. Specialized services often availed by using the core/VAS services provided by the telecommunication company, for example, by placing an audio call or by sending an SMS.

Examples of specialized services are content delivery services for delivering content such as advertisements, weather forecasts, ringtones, wallpapers, astrological horoscopes, etc., social participation services that enable users to take part in market surveys, vote for his/her favorite (for example, among contestants of a reality shown on television), update his/her status on social networking websites, etc. and business (transaction) related services such as payment of bills, exchange of business cards, etc.

There is a general need to deliver such specialized services to the users of phones in a more economical and simplified manner.

BRIEF DESCRIPTION OF THE DRAWINGS

Example embodiments of the present invention will be described with reference to the accompanying drawings briefly described below.

Each of FIGS. 5 and 6 illustrate the manner in which specialized services are delivered to users of phones in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention enables users of phone to avail specialized services using missed calls. A missed call may be better understood in relation to a completed call. When a user/caller first places a call to a recipient user, a corresponding indication (e.g., ringing sound, the phone number of the caller, etc.) is provided on the recipient's phone. In the scenario that the recipient accepts the call, a communication link (in contrast to a physical link made for sending the indication) is established between the caller and the recipient phones, thereby enabling the caller and the recipient user to start audio/visual communication with each other. The establishment of a communication link indicates a completed call.

A missed call, in contrast, represents a call where such a communication link is not established, for example, due to the caller disconnecting (the physical link) during the provision of the indication or the (intended) recipient rejecting the call. The telecommunication company providing the calling service typically does not associate any cost for a missed call to either the caller or the intended recipient.

In one embodiment, a missed call server (MCS) delivers various specialized services in response to receiving missed calls from the users of the phones. MCS, on receiving an indication that a missed call has been placed by a user to a phone number, determines the specialized service corresponding to the phone number, and then sends a data to the service provider offering the determined service. The service provider then delivers the specialized service (sought to be availed) to the user. The determination of the specialized service and the corresponding service provider is performed based on a setup data maintained by MCS.

According to another aspect of the present invention, the delivering of the specialized service is performed by providing a content corresponding to the determined specialized service to the user. Thus, a user is enabled to access various types of content by placing missed calls to different phone numbers.

According to one more aspect of the present invention, a phone number is allocated for each of a set of options of a specialized service. MCS, on receiving the indication that a missed call has been placed by a user to a phone number, determines the specific option corresponding to the phone number, and then includes the specific option in the data sent to the service provider offering the specialized service.

In one embodiment, the specialized service is for updating a website with a message, with the different options corresponding to different messages. Thus in response to the receiving the data indicating the specific option, the service provider updates the website with the message corresponding to the specific option. In another embodiment, the specialized service is for voting for contestants, with the different options corresponding to different contestants. In response to receiving the specific option (noted above), the service provider identifies that the user has voted for a first contestant corresponding to the specific option. The service provider may also increment the number of votes of the first contestant.

In a third embodiment, the specialized service is for conducting a survey, with the different options corresponding different answers for a first question in the survey. The service provider may then identify that a user has selected a first answer for the first question in response to receiving data indicating a corresponding first option (which in turn is sent by MCS in response to the indication that a missed call was placed to a corresponding phone number allocated for the first option).

An aspect of the present invention facilitates the reuse of the same phone numbers for accessing different specialized services. For example, in the third embodiment noted above, the same set of phone numbers allocated for the set of option may be reused for providing the answers to a second (and other) question in the survey. MCS may accordingly be designed to keep track of the question/answers currently sent to the user (and to which a response is expected) for the determination of the specific option selected by the user.

According to yet another aspect of the present invention, a service provider may require that the data sent corresponding to different options be according to different formats (for example, in the form of SMS containing different texts). MCS, accordingly in response to the indication of a missed call, sends the specific option (determined based on the phone number to which the missed call was placed) according to the corresponding format required by the service provider.

Accordingly to one more aspect of the present invention, the specialized service is for performing a monetary transaction such as authorization of a payment of a pre-defined amount to a pre-defined merchant, authorization of a payment of a variable amount to another pre-defined merchant and authorization of the purchase of an item from a vendor on an ecommerce website.

According to another aspect of the present invention, the specialized service is for activation of a payment instrument owned by the user. The service provider performs activation of the payment instrument in response to receiving data from the MCS (in response to a missed call to a first phone number), thereby enabling the user to perform a monetary transaction with the payment instrument. The user after completing the monetary transaction may thereafter place a missed call to a second phone number for deactivation of the payment instrument. Alternatively, the first phone number may be used for deactivation as well, with the service provider (or MCS, in alternative embodiments) determining whether the payment instrument is already activated and performing deactivation of the payment instrument (if already activated).

According to one more aspect of the present invention, the specialized service is for redemption of a coupon (associated with a corresponding phone number), with the service provider performing redemption of the coupon in response to receiving data from MCS that a missed call was placed to the phone number. In one embodiment, the coupon in one among a set of coupons redeemable by the user, with the specific coupon to be redeemed identified (by MCS or service provider) based on a profile of said user.

According to yet another aspect of the present invention, the specialized service is for performing a mechanical action (associated with a corresponding phone number), with the service provider performing the mechanical action in response to receiving data from MCS that a missed call was placed to the phone number. The mechanical action may be one of printing (tickets, vouchers, documents, etc.), locking/unlocking (doors), switching on/off (electrical fixtures such as air conditioners).

An aspect of the present invention facilitates exchange of business cards (or any other personal information) between different users. In one embodiment, a missed call server (MCS) receives a first business card from a first user and a second business card from a second user, and allocates a first phone number to the first business card and a second phone number to the second business card. On receiving an indication that the first user has placed a missed call to the second phone number, MCS sends the second business card to the (phone used by) first user and the first business card to the (phone used by) second user. It may be appreciated that the exchange may be performed in response to an indication that the second user has placed a missed call to the first phone number. Thus, the exchange of business cards is facilitated based on missed calls.

In one embodiment, the first user also specified various pieces of personal information, with MCS then allocating a corresponding phone number to each of the pieces of information. On receiving an indication that the second user has placed a missed call to one of the allocated phone numbers, MCS may send the piece of personal information associated with the phone number. In another embodiment, the first user specifies various pieces of personal information and a white list indicating which of the users can access each piece of personal information (all associated with a single phone number). Thus, on receiving an indication that the second user has placed a missed call to the single phone number, MCS determines the pieces based on the white list and then sends the determined pieces of personal information to the second user.

According to an aspect of the present invention, MCS is designed to further process the content delivered to the users (by the service providers). In one embodiment, in response to a missed call to a phone number, MCS sends a request to the service provider offering the specialized service corresponding to the phone number, receives (from the service provider) a corresponding response containing a content corresponding to the specialized service, adds additional information to the corresponding response, and delivers both the content and the additional information to the user. In one embodiment, the additional information is an advertisement targeted to said user.

According to one more aspect of the present invention, MCS facilitates a user to avail a combination of specialized services (using a single missed call). In one embodiment, in response to a missed call, MCS first delivers both of a first content and a first question to the user, where the first question has a first set of answers, each answer associated with a corresponding one of a first set of phone numbers. On thereafter receiving a second indication that a second missed call has been placed by the user on one of the first set of phone numbers, MCS determines the answer selected by the user for the first question (based on the phone number to which the missed call was placed) and also delivers a second content along with a second question/second set of answers.

In one embodiment, the first and second content corresponds to scores of a sports match at different time instances, while the first and second questions are marketing questions in a market survey. Thus, the user is enabled to take part in the market survey while accessing the scores of the sports match.

Another aspect of the present invention enables users to determine the specific specialized services they wish to avail based on missed calls. In one embodiment, a missed calls server (MCS) allocates a set of phone numbers to each user, with the allocated sets possibly overlapping. MCS then receives from each user the corresponding specialized service associated to each of their allocated set of phone numbers, and stores them as part of a setup data. On receiving an indication that a user has placed a missed call to a phone number, MCS determines the specialized service to be delivered (corresponding to the phone number) based on the user specified associations.

One more aspect of the present invention facilitates validations of users of a website. In one embodiment, a phone number is displayed on the website. On receiving an indication that the user has placed a missed call to the displayed phone number, the user is determined to be a valid user if the missed call was placed from a phone number previously provided by the user to the website (and not a valid user otherwise). Such a validation feature may be used during the registration process of the user, or when the user is trying to access the website (for example, after authenticating a user name and password received from the user). In one embodiment, the phone number is a randomly generated phone number.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
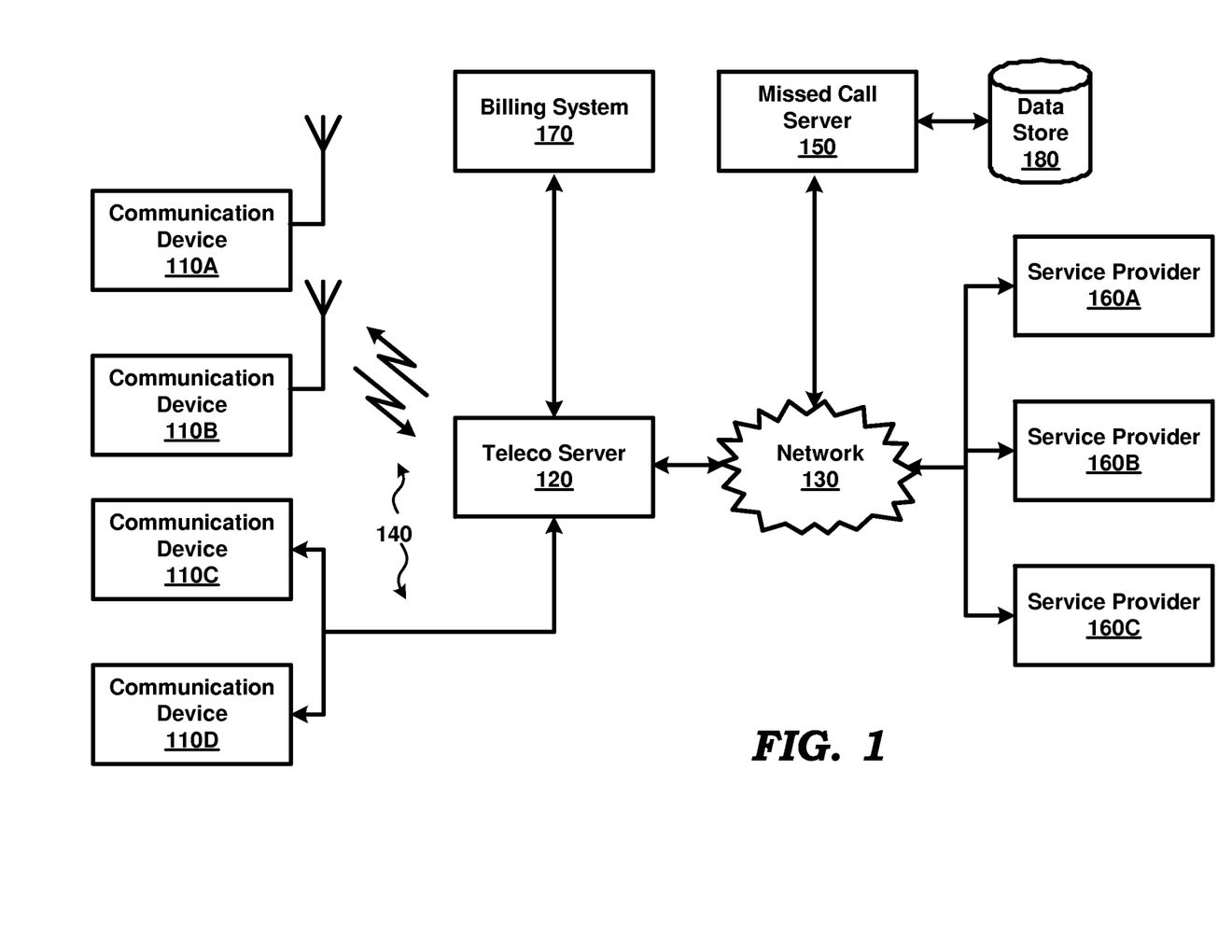
FIG. 1 is a block diagram illustrating the details of an example environment (computing system) in which several aspects of the present invention can be implemented.

FIG. 1 is a block diagram illustrating the details of an example environment (computing system) in which several aspects of the present invention can be implemented. The example environment is shown containing communication devices 110A-110D, telecommunication (telco) server 120, networks 130 and 140, missed called server (MCS) 150, service providers 160A-160C, billing system 170, and data store 180.

Merely for illustration, only representative number/type of systems and locations is shown in the Figure. Many environments often contain many more systems, both in number and type depending on the purpose for which the environment is designed. Each component/block of FIG. 1 is described below in further detail.

Network 140 provides connectivity between communication devices 110A-110D and telco server 120, either via wired paths (such as between 110C, 110D and 120) or wireless paths (such as between 110A, 110B and 120) or a combination of both. Network 140 may be implemented to support various wired standards/protocols such as public switched telephone network (PSTN), integrated services digital network (ISDN), etc. and wireless standards/protocols such as global system of mobile communications (GSM), code-division multiple access (CDMA), etc. well known in the relevant arts. In general, network 140 provides connectivity between multiple systems irrespective of the different standards/protocols used by the systems.

Each of the communication devices 110A-110D represents a device such as phones (either landline or mobile), personal/portable computer, workstation, etc., which is capable of communicating using some of the standards/protocols supported by network 140. Each communication device accordingly, may be capable of receiving and sending data in the form of text, audio, video, etc. over either wired paths (e.g., landline phones 110C-110D) or wireless paths (e.g. mobile phones 110A-110B shown with corresponding antenna). It should be noted that some of the communication devices (e.g., mobile phones) may be used by a corresponding single user, while some other devices (e.g., landline phones) may be shared by multiple users.

Telco server 120 represents a hardware system such as a server that offers communication services that can be availed by users of communication devices 110A-110D over network 140. As noted above, the communication services may include core services such as audio/video calls, FAX, etc. and/or VAS service such as SMS, MMS, email, etc. It may be appreciated that some of the services may have an associated fixed or variable cost (for example, based on the duration for which the service was availed) for the user.

Telco server 120 also associates a corresponding unique identity with each of the communication devices connected to (or which may possible connect to) network 140, to facilitate devices to be identified on the network (e.g., when placing a phone call), to keep track of the services availed by each user/device, etc. In a common implementation, the unique identity is in the form of a "phone number" containing a unique sequence of digits. However, in other embodiments, the identity may be formed from other characters such as alphabets, special characters (&, *, $), etc. as well.

In the following description, it is assumed that phone numbers are used to uniquely identify each communication device on network 140. It is further assumed that each communication device is associated with a single phone number. However, in alternative embodiments, each communication device may be uniquely associated with other types and/or number of identifiers (e.g., with multiple phone numbers). The various features of the present invention can be implemented in such alternative embodiment also without departing from the scope and spirit of various aspects of the present invention, as will be apparent to one skilled in the relevant arts by reading the disclosure provided herein.

Billing system 170 represents a system such as server that keeps track of the total cost of services availed by each user/communication device. In general, whenever a user avails a core/VAS service provided by telco server 120, the user is charged for that service. A specific amount is debited from the account of the user corresponding to the service availed by billing system 170. Billing system 170 is generally designed to work tightly coupled to telco server 120, for keeping track (and accordingly computing the total cost) of the services availed by each user. Alternatively, billing system 170 may be implemented externally to telco server 120 and may be independently maintained by a third party. Billing system 170 may also debit the amount for accessing specialized services offered by third party service providers as described in detail in below sections.

It may be appreciated that telco server 120, network 140 and billing system 170 may all be provided and maintained by a single telecommunication company. Thus, the telecommunication company provides the network for communication as well as various communication services that can be availed by the user over the network. Alternatively, network 140 may be provided and maintained by a network operator different from the telecommunication company, with the telecommunication company providing the various communication services using the infrastructure of the network provider.

As noted in the Background section, telco server 120 may also be designed to facilitate third-party service providers to deliver specialized services. The systems/devices relevant to delivery of specialized services are described in detail below.

Network 130 provides connectivity between telco server 120, service providers 160A-160C and MCS 150. Network 130 may be implemented using protocols such as Transmission Control Protocol (TCP) and/or Internet Protocol (IP), well known in the relevant arts. In general, in TCP/IP environments, a IP packet is used as a basic unit of transport, with the source address being set to the TCP/IP address assigned to the source system from which the packet originates and the destination address set to the TCP/IP address of the target system to which the packet is to be eventually delivered.

Data store 180 represents a non-volatile (persistent) storage facilitating storage and retrieval of a collection of data by MCS 150. Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of service providers' 160A-160C represents a hardware system such as a server that delivers specialized services to the user of communication devices 110A-110D. Different service providers may provide different sets of specialized services, including various type/number of content delivery services, social participation services, and/or business related services. In general, a service provider has an agreement with the telecommunication company on the specific phone number on which one or more specialized services may be accessed by users of the communication devices 110A-110D and also the corresponding manner (audio call, SMS, MMS, email etc.) in which each specialized service is to be accessed and delivered.

The manner in which specialized services may be delivered to users of phones/communication devices according to a prior approach is described below with examples.

3. Prior Approach

Figure 2:
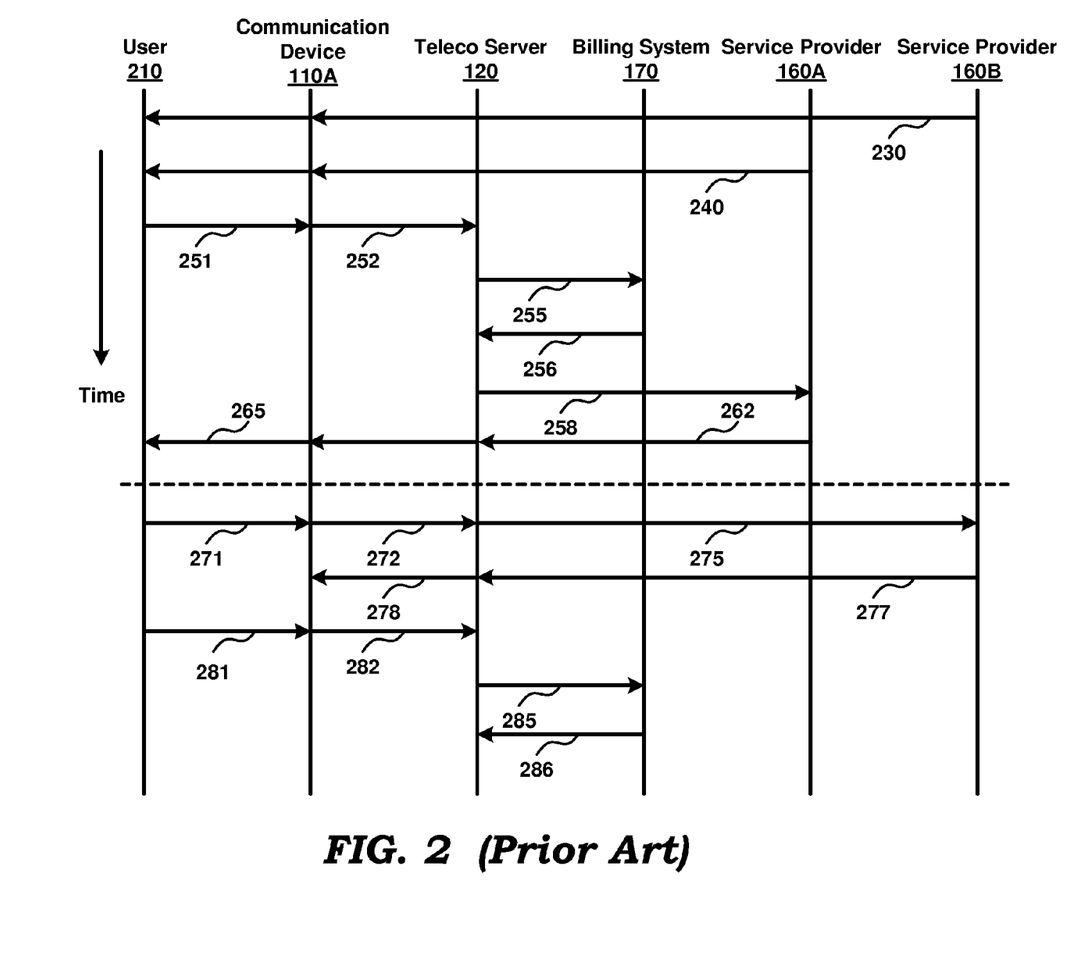
FIG. 2 is a sequence diagram illustrating the manner in which specialized services are delivered to users of phones according to a prior approach in one embodiment.

FIG. 2 is a sequence diagram illustrating the manner in which specialized services are delivered to users of phones according to a prior approach in one embodiment. User 210 is shown using communication device/phone 110A for availing such specialized services provided by third party service providers' 160A-160B.

User 210 may first receive in communication device 110A (for example, as SMS, MMS or emails), the information/details of the various specialized services offered by the different service providers (as indicated by steps 230 and 240). The received information may include the phone number to be used for availing the service and/or specific text to be sent (in the scenario that the service is to be accessed by SMS). Though not shown, user 210 may receive such information through other communication mediums such as television, radio, newspapers, public hoardings, web sites, etc. or from other users as well.

User 210 may select a specialized service to be availed based on the information provided, and then communicate with the corresponding service provider for availing the selected specialized service. The communication with the service provider may be in different forms, such as audio calls, SMS, etc. based on the service sought to be availed. The communication may be synchronous, for example, audio/video calls etc., where the users on both the side of the connection communicate simultaneously or asynchronous, example, etc., where the communication between the users is time delayed. Steps 251 through 265 illustrate the manner in which a user avails the selected specialized service (provided by service provider 160A) using a SMS, and steps 271 through 286 illustrate the manner in which the (same) user avails a different specialized service (provide by service provider 160B) using a completed (audio) call.

Thus, in step 251, user 210 uses communication device 110A to specify the phone number to which the SMS is to be sent and/or specific text to be sent in the body of the SMS corresponding to the selected specialized service. The specific number and text is based on the information provided earlier to the user (e.g., in steps 230 and 240). For example, a user may specify a phone number such as "5888" and a text such as "CAN" for accessing the astrological daily forecast for the sun sign "Cancer". In step 252, communication device 110A requests telco server 120 for sending an SMS to the user specified phone number and containing the user specified text.

In response to the request, telco server 120 first checks whether the called phone number (in the above example, "5888") corresponds to a specialized service offered by a service provider (based on data maintained according to the agreements with the service providers). In the scenario that the called phone number does correspond to a specialized service, telco server 120 determines the phone number of the requesting user/device (hereafter "caller"), and also the specific specialized service/service provider offering the service indicated in the request. For example, telco server 120 may determine that the user selected service is offered by service provider 160A.

Telco server 120 then forwards the above determined information to billing system 170 (step 255) to check whether the requesting user/device has the necessary credit for availing the specialized service using SMS. The amount of credit may be pre-defined based on the specialized service being availed as well as the specific manner (in this case, SMS) in which the service is accessed and/or delivered. Billing system 170 may then send an approval indication that the user has the necessary credit for availing the specified service using SMS (step 256), based on the current balance in the user account or the credit limit of the requesting user.

Telco server 120 may accordingly send a request (typically as TCP/IP packets) indicating the caller's phone number and the specialized service to be availed to service provider 160A (in step 258). Service provider 160A, in response to receiving the request in step 258, may then deliver the specialized service sought to be availed to the user/device indicated in the request (steps 262 and 265). Thus, in the above example, in response to receiving the text "CAN", service provider 160A may first send a response containing the daily forecast for sun sign "Cancer" to telco server 120 (step 262), which in turn may deliver the content of the response in the form of an SMS to communication device 110A/user 210 (step 265). As noted above, the form in which the content is finally delivered to the user may vary based on the specialized service accessed.

Thus, a user avails a specialized service (provided by service provider 160A) using a SMS. The manner in which in which the (same) user avails a different specialized service (provide by service provider 160B) using a completed call is described in detail below.

In step 271, user 210 uses communication device 110A to specify the phone number to which the audio call is to be placed for availing a selected specialized service. For example, a user may specify a phone number such as "1331" for listening to the arrival/departure timings of trains at a local train station. In step 252, communication device 110A requests telco server 120 to place an audio call to the user specified phone number (assumed to correspond to service provider 160B).

Telco server 120, in response to the request, may try to connect to service provider 160B (the intended recipient) corresponding to the requested phone number (step 255) and in response to an accepted indication from service provider 160B (step 277), may connect (establish a communication link between) the caller/user 210 to service provider 160B (278) thereby enabling user 210 to have an audio call with service provider 160B. Service provider 160B may then deliver the specialized service (e.g., information on the arrival/departure timings of the trains) to the caller/user 210 during the audio call.

As noted above, steps 271 though 278 represent a completed call, due to the acceptance of the call by the recipient (service provider 160B) and the establishment of a communication link thereafter for delivering the specialized service. It may be appreciated that the communication between service provider 160B and communication device 110A may be in the form of packets according to the various standards such as GSM/CDMA, and/or TCP/IP, as will be apparent to one skilled in the relevant arts.

User 210, after availing the selected specialized service, may disconnect the call (step 281), with communication device 110A accordingly sending a disconnect indication to telco server 120 (step 282). In a scenario that the user specified phone number corresponds to a specialized service, telco server 120 forwards to billing system 170 (in step 285) the connection/call record (which include information such as the time of the call made, type of the specialized service availed, service provider details etc.) for debiting a pre-defined amount corresponding to the availed specialized service from the account of the user. Billing system 170 may also debit the amount from the account of the service provider delivering the specialized service.

Thus, a user avails a specialized service (provided by service provider 160A) using an audio call. It may be appreciated that there are several drawbacks in the prior approach described above.

For example, one drawback is the complexity associated with the manner of accessing the specialized services. For example, it may be hard/impossible for an illiterate person or for a person travelling in a foreign country to type (in an unknown language) the specific text of an SMS required for accessing a specialized service. Also, some of the users of phones may not be sophisticated enough/comfortable to use anything other than dialing phone numbers and may accordingly find even composing and sending an SMS difficult. These users are therefore unable to access many of the specialized services.

Another drawback is the billing of the users for accessing the specialized services. Even in the scenario that the specialized service is offered free (for example, train information noted above) by the third party service providers, users may still be charged for SMS, audio call, etc. (in steps 255, 285) used to access such free specialized services.

Missed call server 150, provided according to several aspects of the present invention, facilitates delivery of specialized services to the users of phones in a more economical and simplified manner as described below with examples.

4. Delivering Specialized Services

Figure 3:
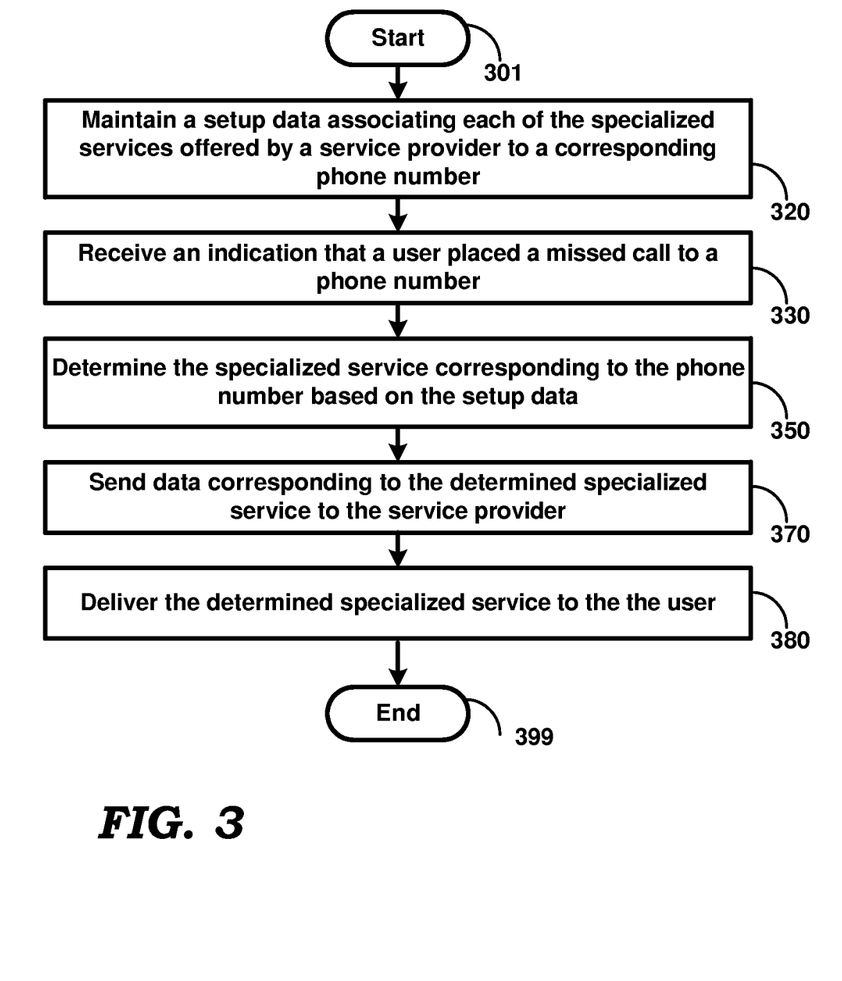
FIG. 3 is a flowchart illustrating the manner in which specialized services are delivered to users of phones according to an aspect of the present invention.

FIG. 3 is a flowchart illustrating the manner in which specialized services are delivered to users of phones according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 320.

In step 320, missed call server (MCS) 150 maintains a setup data associating each of the specialized services offered by a service provider to a corresponding phone number. MCS 150 may first receive a list of specialized services offered by a service provider (one of 160A-160C), interface with telco server 120 for purchasing a large amount of consecutive phone numbers in bulk and then allocate some of the purchased numbers to the specialized services in the list. For example, MCS 150 may allocate a phone number such as "3330001" to the train information service noted above. MCS 150 may also receive different lists from different service providers (160A-160C of FIG. 1) and allocate corresponding phone numbers to all the specialized services offered by the different service providers.

Though each specialized service is generally allocated a corresponding phone number, in some scenarios each of the options of a specialized service may be allocated a unique phone number. For example, when the specialized service is for users to vote for one among a group of options (contestants of a show, answers to a question, etc.) each option may be allocated a corresponding unique phone number. Thus, in a survey/poll, when a question has 3 possible answer options (from which the user is required to select one), MCS 150 may allocate the phone numbers "3330101", "3330102" and "3330103" to the three different options. MCS 150 may then store the specialized services and/or options associated with the corresponding phone number as part of setup data in data store 180.

In one embodiment, each user is allocated a corresponding unique or possibly overlapping set of phone numbers, with each user then assigning the desired specialized services (sought to be availed) to the allocated phone numbers. Thus, two different users (e.g. A and B) may use different phone numbers (e.g., "3330001" and "3330002") to access the same specialized service (e.g., train information), or the same phone number (e.g., "3330001") to access different specialized services (e.g., train information and weather forecast).

Additionally, some of the phone numbers previously allocated may be reused. For example, after the phone numbers "3330101", "3330102" and "3330103" are allocated to the three different options of a question, and after receiving the answer from the user, the same phone numbers may be allocated to the three option of a next question. MCS 150 may keep track of the current question sent to each user, and identify the answers accordingly.

MCS 150, after allocating the phone number, stores in setup data the phone number associated with each specialized service (or options thereof). MCS 150 may also store the details of the service provider offering each of the specialized service. For the embodiment noted above, MCS 150 may store in the setup data, the combination of the user identifier (e.g., his/her phone number), the allocated phone number and the specialized service sought to be availed. The setup data may be maintained in data store 180, for example, as a table in a database, or as the content of a file. Users of phones may then be made aware of the various phone numbers to be used for availing the different (options of the) specialized services.

In step 330, MCS 150 receives an indication that a user placed a missed call to a phone number. The indication may be received when a user places a call to the phone number using a communication device and immediately disconnects the call (before a response is received). In one embodiment described below, MCS 150 on receiving a call to the phone number (from a communication device via telco server 120), disconnects the call to cause a missed call. MCS 150 (using telco server 120) may also determine the phone number of the caller/user to enable delivery of the specialized service.

In step 350, MCS 150 determines the specialized service (and also the specific service provider offering the specialized service) corresponding to the phone number based on the setup data. Thus, in response to receiving an indication that a missed call was placed on the phone number "3330001", MCS 150 may determine the train information service as the corresponding specialized service based on the setup data. MCS 150 may also determine the specific option of the specialized service corresponding to the phone number. Thus, if the missed call was placed for the phone number "3330102", MCS 150 may determine that the user wishes to select the second answer option for the marking question.

In step 370, MCS 150 sends data corresponding to the determined specialized service to the (determined) service provider. The data sent to the service provider may indicate the phone number of the caller/user of step 330, the specialized service (train information, second answer option for the question, etc.) sought to be availed, and other information related to the user/caller (that may have been pre-configured by the user). The data may be sent to the service provider in the form of TCP/IP packets over network 140.

Alternatively, the service provider may have a pre-associated phone number (different from the allocated phone numbers) to which requests for availing specialized services need to be sent in a specific format. MCS 150 may then send data according to the specific format to the pre-associated phone number (based on the determined specialized service sought to be availed), thereby simulating the actions of the user sending the requests directly to the service provider. The detail of such a transaction is described in below sections.

In step 380, the determined specialized service is delivered to the user/caller (by the determined service provider). As noted above, the delivery of the specialized service may entail sending content such as advertisements, weather forecasts, etc. to the communication device of the caller, updating the callers' choice for the question or the votes of contestants, etc. The flowchart ends in step 399.

Thus, MCS 150 facilitates delivery of various specialized services in response to missed calls placed by users of phones. An aspect of the present invention enable a user to access content by using missed calls, as described below with examples.

5. Accessing Content Using Missed Calls

Figure 4:
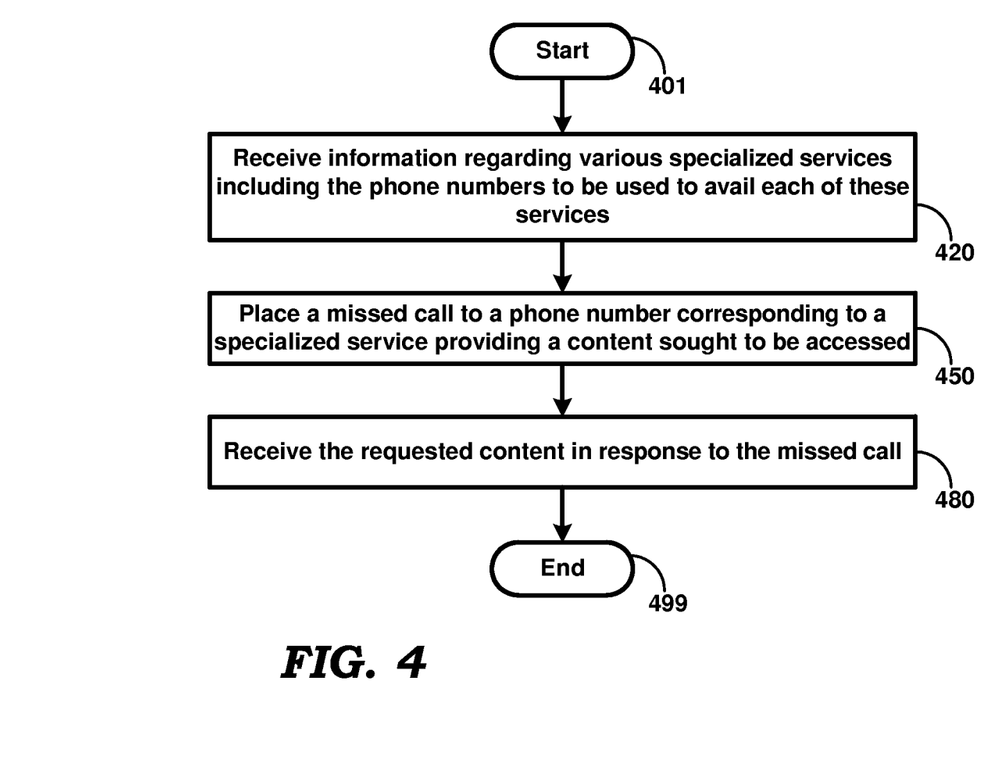
FIG. 4 is a flowchart illustrating the manner in which a user is enabled to access content using missed calls according to an aspect of the present invention.

FIG. 4 is a flowchart illustrating the manner in which a user is enabled to access content using missed calls according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 401, in which control immediately passes to step 420.

In step 420, a user (such as 210) receives information regarding various specialized services including the phone number to be used to avail each of these services. The information may be received directly from the service provider through the user's communication device (such as 110A, similar to steps 230/240 noted above) or through other communication media or other users as well.

In step 450, the user places a missed call to a phone number corresponding to a specialized service providing the content sought to be accessed. For example, the user may use a communication device to place a call to the phone number, and then disconnect the call before any acceptance indication is received from the other side (MCS 150, according to an aspect of the present invention). Alternatively, the call may be disconnected by the intended recipient (MCS 150), thereby causing a missed call.

In step 480, the user (communication device) receives the requested content in response to the missed call. The requested content is generally provided in the form of SMS, email, etc. Audio/video content may be provided in the form of MMS that may be played using the communication device. The flowchart ends in step 399.

Thus, a user is enabled to access content using missed calls. Due to the use of missed calls, there may be no/minimal cost to the user for accessing the requested content. The manner in which a user may avail content delivery services (and also other forms of specialized services) is described below with examples.

6. Illustrative Example

Figure 5:
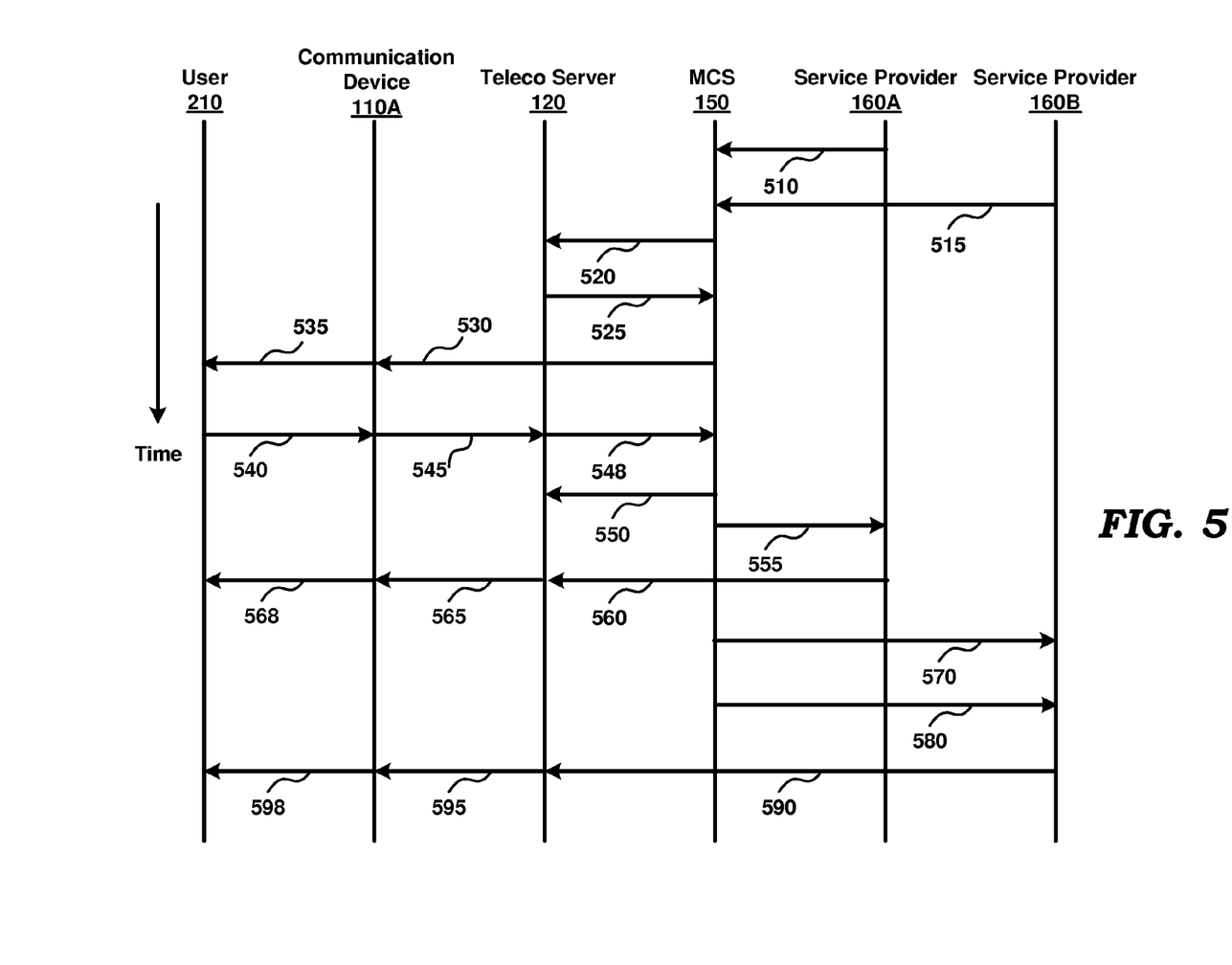
Figure 6:
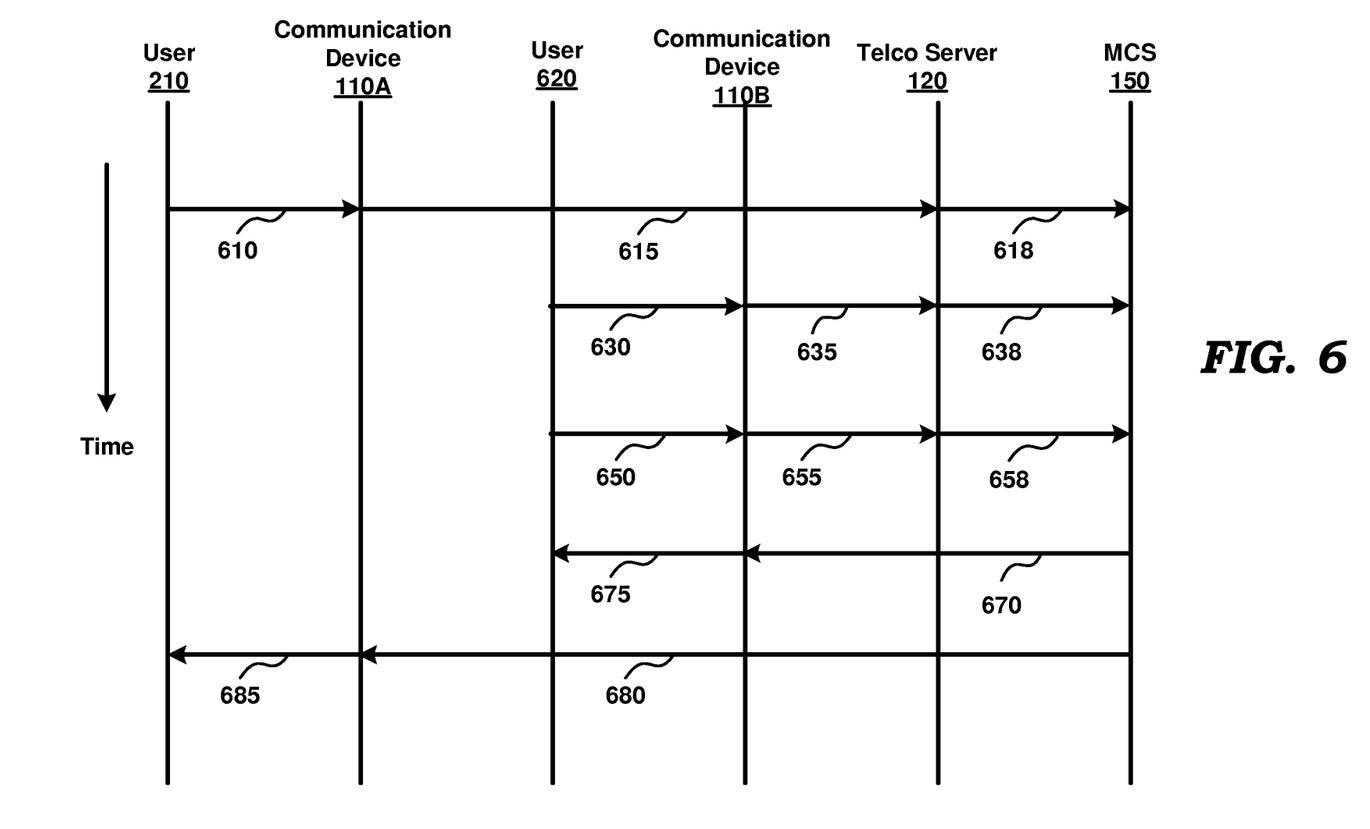

Each of FIGS. 5 and 6 illustrate the manner in which specialized services are delivered to users of phones in one embodiment. Each of the Figures is described in detail below.

Referring to FIG. 5, MCS 150 first receives the list of specialized services offered by service providers 160A-160B (steps 510 and 515), and then interfaces with telco server 120 for allocation of phone numbers (steps 520 and 525). After associating the phone numbers to the various specialized services and storing the association in setup data, MCS 150 forwards the relevant information about the specialized service (including the phone number to be used to avail the service) to user 210 (steps 530 and 535).

MCS 150, on receiving a call from user 210 via telco server 120 (steps 540, 545, and 548), first disconnect the call (step 550) to cause a missed call for the user. MCS 150 then identifies the phone number of user 210, determines the corresponding specialized service sought to be availed, and the specific service provider (assumed to be 160A) offering the determined service based on the setup data. MCS 150, then send data corresponding to the determined service to service provider 160A (step 555), which in turn delivers the specialized service to user 210.

The specialized service sought to be availed may be one of content delivery services, social participation services or business related services. In the scenario that a content delivery service is sought to be availed, service provider 160A sends the content corresponding to the user availed service to communication device 110A used by user 210 (steps 560, 565 and 568). For example, service provider 160A may deliver content such as advertisements, weather forecasts, ringtones, wallpapers, astrological horoscopes, etc. to user 210. Alternatively, service provider 160A may first send a response to MCS 150, which in turn further processes the response based on the profile of user 210 (e.g. append a targeted advertisement) and sends the processed response to the user.

In one embodiment, a restaurant provides a specialized service of enabling the user to know the details of the "special items for the day" on the menu. Thus, in response to a missed call to a phone number associated with the service, service provider 160A provides a list of special items on the menu to user 210 (in steps 560-568), thereby providing further incentive to the user to visit the restaurant.

Other types of content may be similarly provided to the user (in steps 560-568) in response to a missed call (steps 540-550). Examples of such content include (but are not limited to) the latest live results for customer feedback and reviews on restaurants (in general, small businesses), the reviews on other small businesses, the list of stores which are having sales in a mall, the day's deals/sales from a particular store (can be targeted based on user profile), the address and directions to the particular store or location, the latest update/ message that a particular user posted to a website (such as Twitter™ or Facebook™). The above content may be provided in response to missed calls to phone numbers allocated by MCS 150. The allocated phone numbers may be specifically associated with the stores, restaurants, small businesses, malls, etc. or may be general (for example, deals/sales of the day).

It may be appreciated that above feature may be used for "lead capturing" for the small businesses. For example, when a user/caller places a missed call to the phone number associated with a small business, the content noted above may be delivered to the user (in steps 560-568) along with the sending of the caller's phone number to a Customer Relationships Management (CRM) system of that small business (similar to step 570). Other information related to the user profiler (which the user may have previously setup with MCS 150) may also be sent to the CRM system. Thus, leads for the small business are captured in tandem with content delivery, in response to missed calls received from the users.

In the disclosure provided herein, it is assumed that the content is hosted on and delivered by the service providers. However, in alternative embodiments, the content provided by the service providers may be hosted on MCS 150 (for example, stored in data store 180) and updated on a timely basis. MCS 150 may accordingly send the content corresponding to the user availed service directly to user 210, without redirecting the requests to service provider 160A (step 555). In another embodiment, the specialized services may be directly created on, hosted by and delivered by MCS 150. In other words, the operations of service providers (such as 160A) and MCS 150 may be performed by a single system. Such embodiments are also contemplated to be covered by several aspects of the present invention.

7. Delivering Social Participation Services

Missed calls may also be used for availing social participation services. In such a scenario, MCS 150 sends data corresponding to the determined service to the corresponding service provider (assumed to be 160B as indicated by step 570). Service provider 160B may then perform a set of actions corresponding to the user availed service, based on the information sent by MCS 150.

For example, service provider 160B may provide a specialized service of voting for contestants (for example, of a reality show on television). MCS 150 may accordingly allocated different numbers for the contestants. Thus, assuming three contestants, MCS 150 may allocate phone number "599991" for contestant A, "599992" for contestant B, and "599993" for contestant C, and provide such information to the user. On determining that a missed call has been placed to one of the numbers (e.g. "599993") in step 548, MCS 150 may send data indicating contestant C to service provider 160B in step 570, which in turn may add a vote for contestant C.

A user may similarly take part in a survey, where the different phone numbers are allocated to the answers of each question in the survey. The details of the question/answers, contestants, etc. (in general, the options) may be sent to the phone of the user (in the form of SMS, MMS, etc.). Alternatively, the information may be provided through other communication mediums such as television, radio, newspapers, public hoardings, web sites, etc.

MCS 150 may also simulate user actions, in particular, when the service provider (160B) requires the specialized service to be availed in a specific format. In the above noted example, service provider 160B may require the voting to be availed by sending an SMS containing one of the texts "A", "B" or "C" (based on which contestant the user wishes to vote for) to a specific number such as "59999". MCS 150 may accordingly (in step 570) send to the number "59999" of the service provider 160B, the appropriate SMS (e.g., containing the text "C") based on the phone number to which the missed call was placed by the user.

In one embodiment, a user visiting a restaurant/shop/commercial establishment is shown a set of phone numbers, each phone number corresponding to a different message (e.g., "{CE} Rocks.", "{CE} sucks.", "{CE} is cool.", where {CE} is the name of the commercial establishment) to be updated in user's personal account on social networking websites such as Twitter™ or Facebook™. The user may then place a missed call to the desired phone number to have the corresponding message updated in the social networking websites (and/or the website of the commercial establishment). In general, any user specified web pages of specific websites (either simultaneously or separately) may be updated with the corresponding messages, in response to the user placing a missed call to the corresponding phone numbers. The message update may be performed by MCS 150 or by service provider 160B.

An aspect of the present invention enables a user to perform a combination of specialized services by placing a missed call to a single phone number. For example, a user may be enabled to perform a first specialized service of accessing a desired content from one of the content/service providers and a second specialized service of taking part in surveys (that is, answering marketing questions) using a single missed call. In other words, in response to 210 placing a missed call to MCS 150 (steps 540, 545, 548, 550), both of a content delivery from service provider 160A (steps 555, 560, 565, and 568) and forwarding (to service provider 160B) of an answer selected by the user for a marketing question (step 570) is performed.

Such a feature may be specifically desirable, when the content is accessed at frequent intervals by the user (for example, sports scores, stock (portfolio) updates, etc.). Thus, in response to a first missed call, MCS 150 may send a first content (e.g., the current sports score) along with a question in the form of an SMS. The SMS may further indicate 3 possible answer options and the corresponding phone numbers (for example, "3330101", "3330102" and "3330103") to be used for selection of the desired option. The user may then place a second missed call (after an interval) to one of the three phone numbers corresponding to his/her preferred answer to the question. In response, MCS 150 may then send a second content (e.g., the new current score) to the user (as a second SMS), as well as update (a service provider) with the answer selected by the user for the question. It should be noted, that the content is provided irrespective of which of the three numbers is called by the user. MCS 150 may similarly provide another question in the second SMS and receive the preference of the user during the next missed call, thereby enabling the user to take part in a survey during the duration of the sports match.

8. Delivery Business Related Services

Missed calls may also be used for availing business related services. In such a scenario, MCS 150 sends data corresponding to the determined service to the corresponding service provider (assumed to be 160B as indicated by step 580). Service provider 160B may then perform a set of actions corresponding to the user availed service, based on the information sent by MCS 150. Service provider 160B may also send an acknowledgment indicating the status of performance of the set of actions to user 210 via communication device 110A (steps 590, 595 and 598).

For example, a service provider (such as a bank, financial institution, etc.) may provide specialized services for performing monetary transactions from the various accounts of a user using a pre-registered phone number (of communication device 110A). MCS 150 first allocates a phone number associated with a pre-defined amount to be paid to a pre-defined merchant (e.g., for transfer for funds, for recharging the talk time of a mobile phone), with a pre-defined merchant and a variable amount (e.g., for payment of phone/electricity/gas bills), or with the purchase of an item from a merchant on an ecommerce website (where both the merchant and amount are variable). The pre-defined amounts and merchants may be previously setup by the user in MCS 150. The user may then place a missed call to a desired allocated phone number for authorizing the corresponding transaction. In response to a missed call, MCS 150 (or the service provider) may initiate the corresponding transactions associated with the corresponding account authorized by the user.

The service provider may also provide specialized services to active and/or deactivate the payment instruments (such as credit cards, debit cards, bank accounts, etc.) of the user. A user may accordingly place a missed call to a first phone number (allocated by MCS 150) for activating a payment instrument of the user, use the payment instrument for performing a transaction and after the transaction is completed, place a missed call to a second phone number (again allocated by MCS 150) for deactivating the payment instrument. Alternatively, the same phone number may be used for activating and deactivating the payment instrument, with MCS 150 designed to keep track of missed calls placed by the user, determine the current state of the payment instrument (whether activated or deactivated) and to perform the corresponding reciprocal action. In another embodiment, a payment instrument may be deactivated by default after each transaction is completed, with the user using only the first phone number for activating the payment instrument for each subsequent transaction.

Missed calls may also be used by websites to validate a user either during the registration process of the user, or when the user is trying to access the website (for example, after authenticating a user name and password received from the user). Such validation may be required to ensure that the accessing user is a correct/legitimate human user who is registered with the website and not a fraudulent user/automated system. In such a scenario, the website may display a randomly generated phone number, with the user required to place a missed call to the displayed phone number from his/her phone number (previously provided to the website). The user on placing a missed call from his/her phone number is identified to be in possession of the corresponding phone (thereby indicting that the user is a valid human user).

Another specialized service that may be provided based on missed calls is the redemption of coupons by a user. In one approach, a coupon or a set of coupons may be associated with a specific phone number (allocated by MCS 150), which is then displayed to the users at the various point of sales (POS). In response to a missed call to the specific phone number, MCS 150 selects one of the coupons (e.g., based on the POS, the user profile, etc.) and forwards such information to service provider 160B, which in turn causes the selected coupon to be redeemed for the user at the POS. Alternatively, the user may select the coupon to be redeemed from the set of coupons (using the same or another missed call). In another approach, MCS 150 maintains the personal coupons redeemable for each user, with a user then placing a missed call to a pre-determined number to select and redeem the appropriate personal coupon.

It may be appreciated that the user may be provided a feedback (in steps 590, 595, and 598) in response to users placing missed calls to specific phone numbers. For example, in response to user placing a missed call to a phone number for supporting a cause, an SMS may be sent to the user in the form "Thanks for supporting XYZ. You and {count} other people have supported." where {count} indicates a current (real-time) number (or a percentage) of users who have already provided support for the same cause (in other words, who have already placed missed calls earlier to the same phone number). Similarly, after placing a missed call to rate a restaurant or small business, an SMS in the form "70% of people like the restaurant, 30% of people did not like their experience." may be sent to the user as the feedback. Thus, after each user avails the service, their vote is tabulated and the updated results are sent back (to the next user availing the service). In an embodiment, a separate phone number may be provided to enable the users to only fetch the latest results (without actually availing the service or voting).

9. Exchanging User Information

Referring to FIG. 6, steps 610 through 685 illustrate the manner in which users are enabled to exchange business cards using missed calls according to an aspect of the present invention. In step 610, user 210 uses communication device 110A to send his/her business card to MCS 150 for registration. In response to receiving a business card from user 210 (steps 615 and 618), MCS 150 allocates a corresponding phone number to the registered business card/user. Another user 620 may similarly register his/her business card with MCS 150, as indicated by steps 630, 635 and 638.

In the scenario that user 620 wishes to exchange business cards with user 210, user 620 may place a missed call the phone number corresponding to user 210 or his/her business card (steps 650, 655 and 658). In response to the missed call, MCS 150 sends the business card of user 210 to user 620 (steps 670 and 675) and also sends the business card of user 620 to user 210 (steps 680 and 685), thereby facilitating the exchange of business cards between the two users. It may be appreciated that a similar action may be performed when the exchange is initiated by user 210 (by placing a missed call to the phone number of the business card of user 620). Similarly, users may place missed calls to the phone numbers of other users and exchange business cards.

It may be appreciated that the above approach may be implemented for exchanging any pre-determined and pre-configured information associated with each individual user (and not necessarily business cards, as described above). For example, user 210 may first setup (in steps 610, 615 and 618) multiple pieces of personal information in MCS 150, each piece of information being allocated a corresponding phone number. Other users (such as 620) may access the corresponding pieces of personal information by placing missed calls to the appropriate phone numbers.

Alternatively, all the pieces of information may be associated with a single phone number, with user 210 also specifying the various permissions for other users/user types. User 210 may specify that a first piece of information is to be sent for a first user/user type, and second piece of information is to be sent for a second user/user types. Thus, the user specifies a white list indicating which of the users/user types can access which of the pieces of personal information. MCS 150, in response to identifying that a missed call has been placed to the single phone number by user 620, first inspects the white list to determine the specific pieces of information accessible to user 620, and then forwards only the determined specific pieces to user 620. The above described white listing of users/user types may be implemented in the context of other embodiments described above, as will be apparent to one skilled in the relevant arts by reading the disclosure herein.

10. Performing Mechanical Actions

An aspect of the present invention facilitates physical/mechanical actions to be performed as part of the specialized services made available to the users. Thus, in response to a missed call from a user to a phone number, a specific physical action determined based on the profile of the user is performed. For example, a user may be provided a phone number to which the user can place a missed call to cause printing of a ticket, receipt or voucher. Such a feature may be desirable in scenarios where paper copies of the tickets/receipts are necessary, for example, in an airport or a cinema hall. The specific tickets/receipts to be printed may be determined based on the profile of the user placing the missed call. MCS 150 (or a service provider such as 160A) may maintain a list of user phone numbers and associated tickets. In response to receiving a missed call, MCS 150 may identify the corresponding ticket of the user based on the user's phone number, and then print the corresponding ticket.

Other examples of physical/mechanical actions that can be performed in response to missed calls include locking/unlocking doors, switching on/off electrical fixtures such as air conditioners, etc. Some of these actions may be performed based on the permissions associated with the users, for example, a first user may have permission to unlock doors 1 and 2, while a second user may have permission to unlock only door 2. Furthermore, the physical/mechanical action may be performed only when a user successfully completes another action. For example, a voucher may only be printed or a door may only be unlocked after a user successfully answers a series of questions by placing the appropriate missed calls.

It may be appreciated that the above described specialized services may be implemented in a known way. For example, some of the specialized services may be implemented as corresponding applications (executing in MCS 150 or one of service providers 160A-160C), which interacts with a detection module (executing in MCS 150) designed to identify missed calls. On identifying that a missed call has been placed to a phone number (associated with a specialized service), the detection module invokes the application corresponding to the specialized service. The application may then deliver the specialized service to the user.

It should be further appreciated that the features described above can be implemented in various embodiments as a desired combination of one or more of hardware, executable modules, and firmware. The description is continued with respect to an embodiment in which various features are operative when executable modules are executed.

11. Digital Processing System

Figure 7:
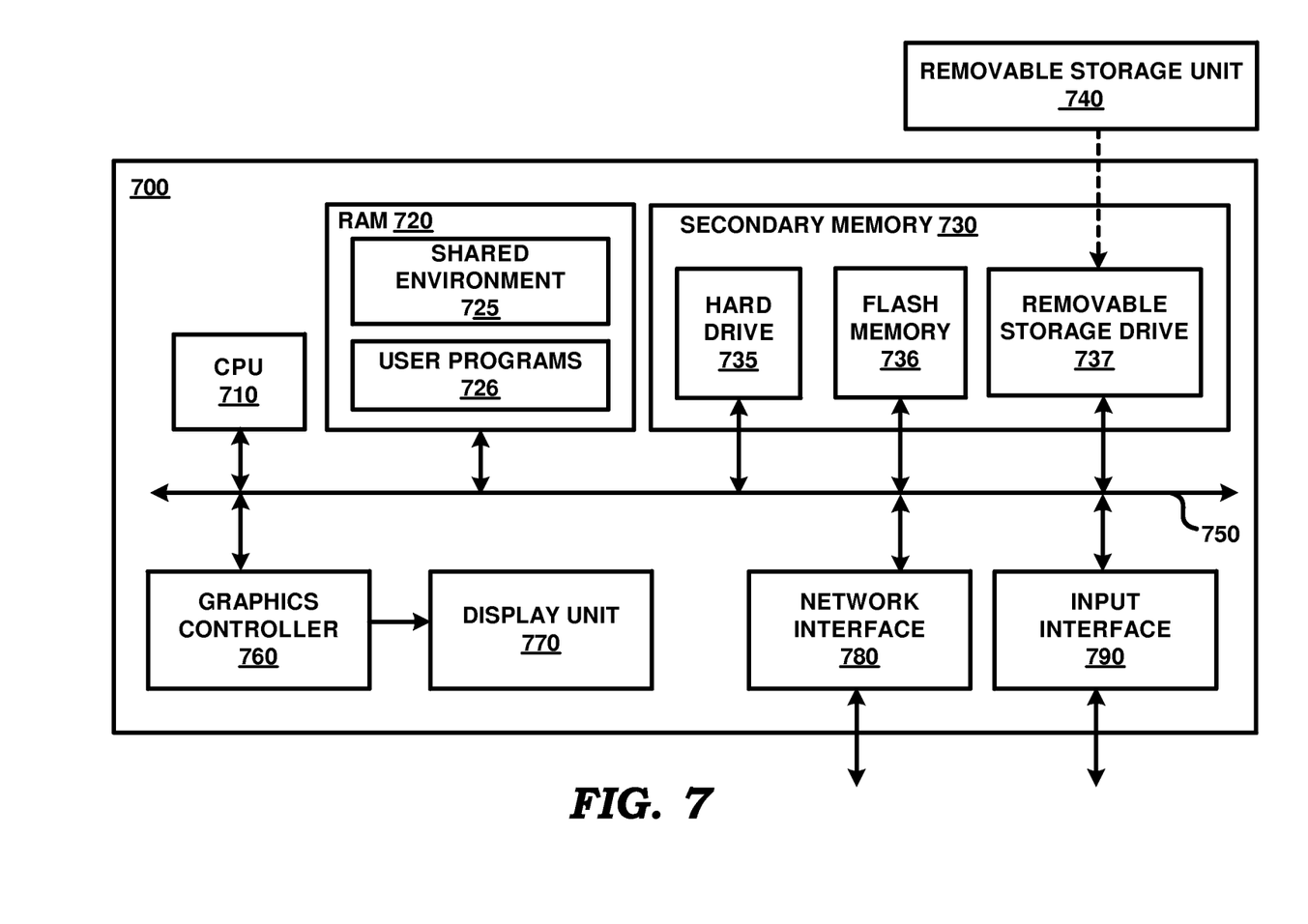
FIG. 7 is a block diagram illustrating the details of a digital processing system in which various aspects of the present invention are operative by execution of appropriate executable modules.

FIG. 7 is a block diagram illustrating the details of digital processing system 700 in which various aspects of the present invention are operative by execution of appropriate executable modules. Digital processing system 700 may correspond to missed call server 150 or one of communication devices 110A-110D.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting operating environment 725 and/or other user programs 726 (such as applications, web/application server software, RDBMS, etc.). In addition to operating environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems connected to the network.

Secondary memory 730 may contain hard drive 735, flash memory 736, and removable storage drive 737. Secondary memory 730 may store the data (for example, portions of setup data) and software instructions (for example, implementing the program logic of FIGS. 3 and 4), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

The invention claimed is:

1. A method of delivering specialized services to users of phones by a missed call server, said method comprising:
maintaining a setup data related to a plurality of specialized services, each specialized service of said plurality of specialized services having a corresponding plurality of options, said setup data associating each of said corresponding plurality of options to a corresponding phone number, wherein a first specialized service of said plurality of specialized services having a first plurality of options, wherein said setup data associates each of said first plurality of options to a corresponding one of a first plurality of phone numbers, said setup data also indicating that said first specialized service is offered by a first service provider;

receiving a first missed call and a second missed call, wherein said first missed call is from a first user to a first phone number of said first plurality of phone numbers, and said second missed call is from a second user to a second phone number of said first plurality of phone numbers;

determining, based on said setup data, a first option of said first plurality of options corresponds to said first phone number, and that a second option of said first plurality of options corresponds to said second phone number; and sending data specifying said first option and said second option to said first service provider in view of said setup data indicating that said first service provider is offering said first specialized service with said first option and said second option, said missed call server containing a processor and a memory, said processor executing instructions stored in said memory to perform at least one of said maintaining, said receiving, said determining and said sending.

2. The method of claim 1, wherein said service provider requires receipt of data as a short message service (SMS), wherein said missed call server sends said data indicating that said first user selected said first option in the form of said SMS to said first service provider, in response to receipt of said first missed call.

3. The method of claim 2, wherein said first specialized service comprises voting for contestants, wherein said plurality of options corresponds to a plurality of contestants, said first option corresponding to a first contestant of said plurality of contestants,
wherein said first service provider identifies that said first user has voted for said first contestant in response to receiving said data in the form of said SMS.

4. The method of claim 1, wherein said first specialized service comprises conducting a survey, wherein said plurality of options corresponds to a first set of answers for a first question in said survey, said first option corresponding to a first answer in said first set of answers,
wherein said first service provider identifies that said first user has selected said first answer for said first question in response to receiving said data indicating that said first missed call to said first phone number has been received from said first user by said missed call server.

5. The method of claim 4, wherein said survey includes a second question following said first question, said first service provider sending said second question to said user after receiving said data indicating that said first missed call is received from said user,
wherein said plurality of options corresponds to a second set of answers for said second question, said first option corresponding to a second answer in said second set of answers, said method further comprising:
receiving a third missed call to said first phone number; and
determining, by said first service provider, that said user has selected said second answer for said second question in response to receiving of said third missed call following said first missed call, whereby said first phone number is used to indicate both of the selection of said first answer in said first set of answers and the selection of said second answer in said second set of answers.

6. The method of claim 1, wherein said first specialized service comprises activation and deactivation of a payment instrument owned by said user, said method further comprising:

determining, by said first service provider in response to receiving said data, whether said payment instrument is already activated;

if said determining determines that said payment instrument is not already activated, performing, by said first service provider, activation of said payment instrument, thereby enabling said user to perform a monetary transaction with said payment instrument; and if said determining determines that said payment instrument is already activated, performing, by said first service provider, deactivation of said payment instrument in response to said determining that said payment instrument is already activated, whereby said user is enabled to activate and deactivate said payment instrument by placing missed calls to said first phone number.

7. The method of claim 1, wherein said first specialized service comprises redemption of coupons, wherein said plurality of options corresponding to a set of coupons redeemable by said user, wherein said determining further identifies that a first coupon corresponding to said first option is to be redeemed in response to said indication, wherein said sending sends said first coupon as part of said data to said first service provider in response to said identifying, wherein first service provider performs redemption of said first coupon in response to receiving said data.

8. A non-transitory machine readable medium storing one or more sequences of instructions for causing a missed call server to deliver specialized services to users of phones, wherein execution of said one or more sequences of instructions by one or more processors contained in said missed call server causes said missed call server to perform the actions of:

maintaining a setup data associating each of a plurality of specialized services to a corresponding one of a plurality of phone numbers in a data store, wherein said setup data further indicates a corresponding one of a plurality of service providers offering each of said plurality of specialized services;

receiving an indication that a user placed a missed call to a first phone number contained in said plurality of phone numbers;

determining, based on said setup data, a first specialized service corresponding to said first phone number and a first service provider offering said first specialized service, said first specialized service being contained in said plurality of specialized services and said first service provider being contained in said plurality of service providers;

sending a request for said first specialized service to said first service provider;

receiving, from said first service provider, a corresponding response containing a content corresponding to said first specialized service;

adding additional information to said corresponding response; and delivering said content with said additional information to said user as a response to said indication.

9. The machine readable medium of claim 8, wherein said additional information is an advertisement targeted to said user.

10. The machine readable medium of claim 9, further comprising:

storing a first content corresponding to said first specialized service;

receiving a request to update said first content with a second content; and replacing said first content with said second content in response to receiving said request, wherein said delivering comprises sending said first content and said additional information to said user if said indication is received before said request, and sending said second content to said user otherwise.

11. The machine readable medium of claim 10, wherein said request is received in response to users placing missed calls to a second phone number, wherein said first content and said second content are the number of users who placed missed calls to said second phone number respectively at a first time instance and a second time instance.

12. The machine readable medium of claim 8, wherein said additional information is a first question to said user, wherein said first question has a first set of answers, each answer associated with a corresponding one of a first set of phone numbers contained in said plurality of phone numbers, further comprising:

receiving a second indication that a second missed call has been placed by said user on one of said first set of phone numbers;

determining the answer selected by said user for said first question based on said one of set of phone numbers to which said missed call was placed; and delivering a second content and a second question to said user, as a second response to said second indication, wherein said second content is received from said first service provider and said second question is added as said additional information to said second response.

13. The machine readable medium of claim 12, wherein said first content and second content corresponds to scores of a sports match at different time instances provided by said first service provider, wherein said first question and said second question are marketing questions in a market survey added as additional information, whereby said user is enabled to take part in said market survey while accessing the scores of said sports match.

14. A method of validating users of a website by a missed call server, said method comprising:

displaying a phone number to a user on said website, wherein said phone number is a randomly generated phone number;

receiving a validating phone number from said user on said website, and associating said phone number with said validating phone number of said user;

receiving an indication that said user has placed a missed call to said phone number; and determining that said user is a valid user if said missed call was placed from the validating phone number previously provided by said user to said website, said missed call server containing a processor and a memory, said processor executing instructions stored in said memory to perform at least one of said displaying, said receiving, and said determining.

* * * * *